US012046864B2

(12) United States Patent
Iwamoto

(10) Patent No.: US 12,046,864 B2
(45) Date of Patent: Jul. 23, 2024

(54) HERMETIC TERMINAL

(71) Applicant: KYOCERA Corporation, Kyoto (JP)

(72) Inventor: Koichi Iwamoto, Omihachiman (JP)

(73) Assignee: Kyocera Corporation, Kyoto (JP)

( * ) Notice: Subject to any disclaimer, the term of this patent is extended or adjusted under 35 U.S.C. 154(b) by 368 days.

(21) Appl. No.: 17/629,506

(22) PCT Filed: Jul. 21, 2020

(86) PCT No.: PCT/JP2020/028226
§ 371 (c)(1),
(2) Date: Jan. 24, 2022

(87) PCT Pub. No.: WO2021/015189
PCT Pub. Date: Jan. 28, 2021

(65) Prior Publication Data

US 2022/0247101 A1 Aug. 4, 2022

(30) Foreign Application Priority Data

Jul. 25, 2019 (JP) ................................ 2019-136951

(51) Int. Cl.
*H01R 9/18* (2006.01)

(52) U.S. Cl.
CPC ...................................... *H01R 9/18* (2013.01)

(58) Field of Classification Search
CPC ...... H01R 9/18; H01R 13/521; H01R 13/533; H01R 13/74; H01R 13/02; H01R 13/03; H01R 13/40; H01R 13/502
See application file for complete search history.

(56) References Cited

U.S. PATENT DOCUMENTS

| | | | | |
|---|---|---|---|---|
| 4,296,275 A * | 10/1981 | Bowsky | ............... | H01B 17/305 439/693 |
| 10,710,926 B2 * | 7/2020 | Nishikawa | .............. | C03C 3/087 |
| 11,233,354 B2 * | 1/2022 | Fujiwara | ............. | G01L 19/0084 |
| 2004/0173370 A1 * | 9/2004 | Deng | ..................... | H01B 17/30 174/50.5 |

(Continued)

FOREIGN PATENT DOCUMENTS

| | | |
|---|---|---|
| JP | S59-47916 U | 3/1984 |
| JP | 2002-254166 A | 9/2002 |

(Continued)

*Primary Examiner* — Travis S Chambers
(74) *Attorney, Agent, or Firm* — Procopio, Cory, Hargreaves & Savitch LLP

(57) ABSTRACT

The hermetic terminal according to the present disclosure includes a conductor having a pillar shape, a metal ring coaxially positioned with the conductor, an insulating ring coaxially positioned with the conductor, a flange that is disposed on the insulating ring and that divides the conductor into two regions, a first fixing member configured to fix the insulating ring to the conductor, and a second fixing member configured to fix the insulating ring to the flange. The metal ring, the first fixing member, and the second fixing member are formed of an Fe—Co based alloy, an Fe—Co—C based alloy, an Fe—Ni based alloy, or an Fe—Ni—Co based alloy. The metal ring and the first fixing member are connected to each other, and the insulating ring is fixed to the conductor at a distance from the metal ring.

10 Claims, 4 Drawing Sheets

(56) References Cited

U.S. PATENT DOCUMENTS

| | | | | |
|---|---|---|---|---|
| 2007/0239223 | A1* | 10/2007 | Engmark | A61N 1/3754 607/37 |
| 2015/0189775 | A1 | 7/2015 | Kaqnchiku | |
| 2016/0020547 | A1* | 1/2016 | Khadkikar | F04B 39/121 439/587 |
| 2017/0148596 | A1 | 5/2017 | Ozaki et al. | |
| 2019/0313539 | A1* | 10/2019 | Okuno | H01R 13/521 |

FOREIGN PATENT DOCUMENTS

| | | | |
|---|---|---|---|
| JP | 2006-210172 | A | 8/2006 |
| JP | 2007-201335 | A | 8/2007 |

* cited by examiner

HERMETIC TERMINAL

TECHNICAL FIELD

The present disclosure relates to a hermetic terminal.

BACKGROUND ART

Conventionally, a hermetic terminal using a ceramic ring that can be electrically insulated from a power supply system has been used in a part of a high vacuum exhaust system used for a particle accelerator, a nuclear fusion device, and the like. For example, Patent Document 1 discloses such a ceramic ring.

CITATION LIST

Patent Literature

Patent Document 1: JP 59-47916 UM-A

SUMMARY OF INVENTION

A hermetic terminal according to the present disclosure includes a conductor having a pillar shape, a metal ring coaxially positioned with the conductor, an insulating ring coaxially positioned with the conductor, a flange that is disposed on the insulating ring and that divides the conductor having the pillar shape into two regions, a first fixing member configured to fix the insulating ring to the conductor, and a second fixing member configured to fix the insulating ring to the flange. The metal ring, the first fixing member, and the second fixing member are formed of an Fe—Co based alloy, an Fe—Co—C based alloy, an Fe—Ni based alloy, or an Fe—Ni—Co based alloy. The metal ring and the first fixing member are connected to each other, and the insulating ring is fixed to the conductor at a distance from the metal ring.

DESCRIPTION OF EMBODIMENTS

In a case where a ceramic ring is fixed to a conductor via a sleeve in a state in which a Kovar ring is abutted on either side of the ceramic ring, when the ceramic ring and the sleeve and the conductor and the sleeve are connected to each other using a brazing material, cracks may occur in the ceramic ring and the sleeve after bonding. In particular, in a case where the conductor is heavy, the occurrence of cracks is significant.

As described above, a hermetic terminal according to the present disclosure includes a conductor having a pillar shape, a metal ring coaxially positioned with the conductor, an insulating ring coaxially positioned with the conductor, a flange that is disposed on the insulating ring and that divides the conductor having the pillar shape into two regions, a first fixing member configured to fix the insulating ring to the conductor, and a second fixing member configured to fix the insulating ring to the flange. The metal ring, the first fixing member, and the second fixing member are formed of an Fe—Co based alloy, an Fe—Co—C based alloy, an Fe—Ni based alloy, or an Fe—Ni—Co based alloy. The metal ring and the first fixing member are connected to each other, and the insulating ring is fixed to the conductor at a distance from the metal ring. According to such a configuration, in the hermetic terminal according to the present disclosure, even when the first fixing member and the second fixing member are each bonded to the insulating ring by a brazing material, stress remaining on the surface layer portion of the insulating ring on the second fixing member side is reduced. As a result, cracks are less likely to occur in the insulating ring, the first fixing member, and the second fixing member.

Figure 1:
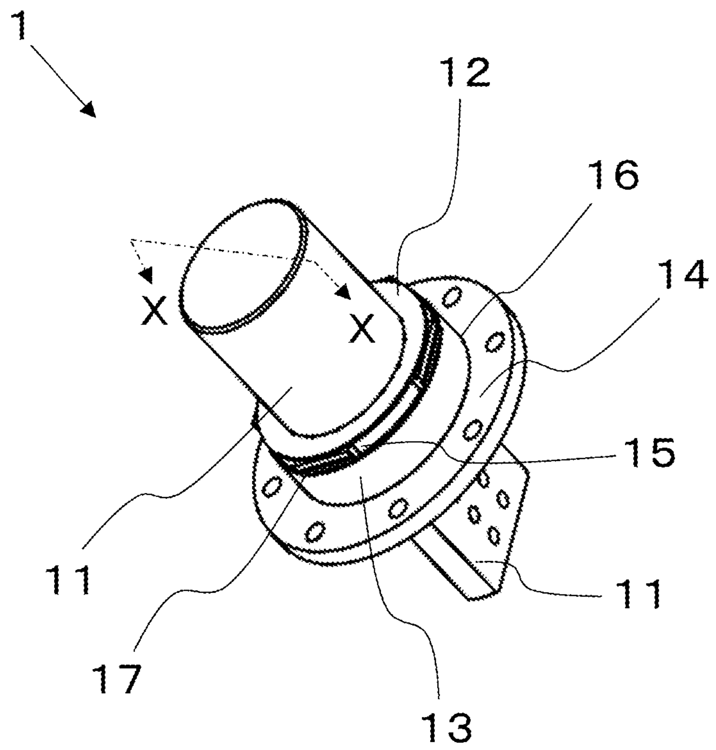
FIG. 1 is a perspective view illustrating a hermetic terminal according to an embodiment of the present disclosure.

A hermetic terminal according to an embodiment of the present disclosure will be described with reference to FIGS. 1 and 2. A hermetic terminal 1 according to an embodiment illustrated in FIG. 1 includes a conductor 11, a metal ring 12, an insulating ring 13, a flange 14, a first fixing member 15, a second fixing member 16, and a spacer 17.

The conductor 11 included in the hermetic terminal 1 according to an embodiment has a pillar shape, and the size and shape thereof are not limited as long as the conductor 11 has a pillar shape. As illustrated in FIG. 1, the conductor 11 may have a shape such that a cylindrical portion and a quadrangular pillar shape (plate shape) portion are present. The size of the conductor 11 may be appropriately set according to a device or the like to be provided with the hermetic terminal 1. In a case where the conductor 11 has a shape in which a cylindrical portion and a quadrangular pillar shape (plate shape) portion are connected to each other in an axial direction, for example, the length (total length) thereof is, approximately from 200 mm to 300 mm, the outer diameter of the cylindrical portion is approximately from 90 mm to 110 mm, and the width of the quadrangular pillar shape (plate shape) portion is approximately from 80 mm to 88 mm. The conductor 11 is formed of, for example, copper or a copper alloy such as oxygen-free copper, tough pitch copper, or phosphorous deoxidized copper.

The metal ring 12 included in the hermetic terminal 1 according to an embodiment is provided so as to be coaxially positioned with the conductor 11. The metal ring 12 is formed of an Fe—Co based alloy, an Fe—Co—C based alloy, an Fe—Ni based alloy, or an Fe—Ni—Co based alloy. In a case where the metal ring 12 is formed of one of such specific alloys, the alloy has an average coefficient of linear expansion from 30° C. to 400° C. that is lower than the average coefficient of linear expansion of copper, copper alloys, or the like constituting the conductor 11. As a result, when heat bonding is performed using a brazing material described below, no gap is generated between the metal ring 12 and the conductor 11 and, consequently, the reliability of airtightness can be increased. In a case where the insulating ring 13 is formed of a ceramic, the average coefficient of linear expansion thereof from 30° C. to 400° C. is the lowest among these alloys. In a case where heat bonding is performed close to the average coefficient of linear expansion of the ceramic in the above temperature range, an Fe—Ni—Co based alloy may be preferably used from the viewpoint that the risk of occurrence of cracks in the ceramic is the lowest. The metal ring 12 is attached to an outer peripheral surface of the conductor 11 by, for example, a silver brazing material (such as Bag-8).

Figure 2:
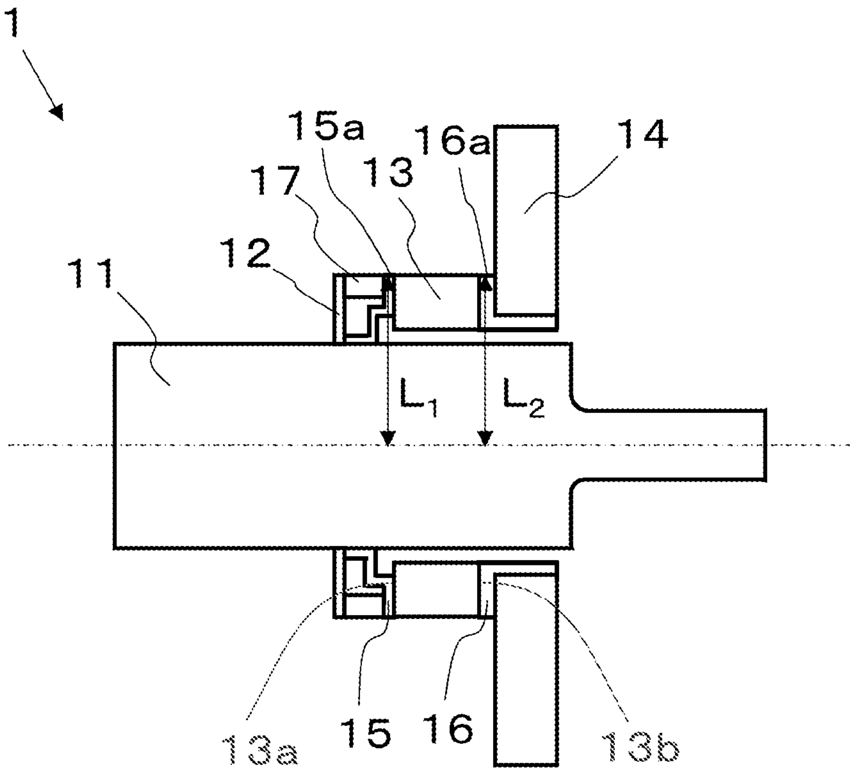
FIG. 2 is an explanatory diagram illustrating a cross section taken along a line X-X illustrated in FIG. 1.

As illustrated in FIG. 2, the metal ring 12 is also connected to the first fixing member 15. When the metal ring 12 is connected to the first fixing member 15, a bonding part between the conductor 11 and the first fixing member 15 can be reinforced. The metal ring 12 and the first fixing member 15 may be connected to each other by, for example, brazing or may simply be in contact with each other.

The size of the metal ring 12 is not limited as long as the conductor 11 can be inserted therein. For example, the outer diameter of the metal ring 12 is from 1.1 to 1.4 times the outer diameter of the conductor 11. The thickness of the metal ring 12 is not limited and is, for example, approximately from 2 mm to 4 mm.

The insulating ring 13 included in the hermetic terminal 1 according to an embodiment is provided so as to be coaxially positioned with the conductor 11. The flatness of each of main surfaces 13*a* and 13*b* on both sides of the insulating ring 13 is preferably 50 μm or less. When the flatness of the main surface 13*a* is 50 μm or less, in a case where a metallization layer (not illustrated) is formed on the main surface 13*a* and the first fixing member 15 and the insulating ring 13 are bonded to each other by a brazing material, a gap is less likely to be formed between the main surface 13*a* and the metallization layer and, consequently, the bonding reliability between the first fixing member 15 and the insulating ring 13 is improved. Similarly, when the planarity of the main surface 13*b* is 50 μm or less, in a case where a metallization layer (not illustrated) is formed on the main surface 13*b*, and the second fixing member 16 and the insulating ring 13 are bonded to each other by a brazing material, a gap is less likely to be formed between the main surface 13*b* and the metallization layer and, consequently, the bonding reliability between the second fixing member 16 and the insulating ring 13 is improved. The metallization layer contains, for example, from 10 mass % to 30 mass % of manganese, the balance being molybdenum.

The parallelism of the main surface 13*a* with respect to the main surface 13*b* is preferably 0.1 mm or less. In a case where the parallelism is 0.1 mm or less, when the conductor 11 is inserted into and fixed to a space of the insulating ring 13 on an inner peripheral side, the possibility that the inner peripheral surface of the insulating ring 13 is brought into contact with an outer peripheral surface of the conductor 11 and scratches the outer peripheral surface is reduced. The insulating ring 13 is not limited as long as it is formed of an insulating material, for example, a material having a volume resistivity of $10^{12}$ Ω·m or more. Examples of such an insulating material include a ceramic containing aluminum oxide, silicon carbide, or silicon nitride as a main component. Among these materials, a ceramic containing aluminum oxide as the main component is preferably used from the viewpoint that the primary raw material is inexpensive and processing is easy.

The crystals of aluminum oxide preferably have an average particle diameter of from 5 μm to 20 μm. In the present specification, the "main component" means a component that accounts for 80 mass % or more of the total of 100 mass % of the components constituting the ceramic. The identification of each component contained in the ceramic may be performed with an X-ray diffractometer using a CuKα beam, and the content of each component may be determined, for example, with an inductively coupled plasma (ICP) emission spectrophotometer or a fluorescence X-ray spectrometer.

When the average particle diameter of the crystals of aluminum oxide is 5 μm or more, an area occupied by the grain boundary phase per unit area is less than that when the average particle diameter is less than 5 μm. As a result, thermal conductivity is improved. On the other hand, when the average particle diameter is 20 μm or less, the area occupied by the grain boundary phase per unit area is larger than that when the average particle diameter is more than 20 μm. As a result, the adhesiveness is enhanced due to an anchor effect of the components constituting the brazing material, thereby improving reliability, and increasing mechanical strength.

The particle diameter of the crystals of aluminum oxide can be obtained as follows. First, diamond abrasive particles with an average particle diameter D50 of 3 μm are used for polishing with a copper grinder from the surface of the insulating ring 13 to a depth of 0.6 mm in the thickness direction.

Thereafter, diamond abrasive particles with an average particle diameter D50 of 0.5 μm are used for polishing with a tin grinder. The polished surface obtained by these processes of polishing is heat-treated at a temperature 1480° C. until the crystal grains and the grain boundary layer become distinguishable to obtain an observation surface. The heat treatment is performed for approximately 30 minutes, for example.

The observation surface is observed with an optical microscope and captured, for example, at a magnification of 400 times. Within the captured image, a range of an area of $4.8747\times10^2$ μm is defined as a measurement range. By analyzing the measurement range using image analysis software (for example, Win ROOF manufactured by Mitani Corporation), the particle diameters of the crystals can be calculated and the average particle diameter can be calculated from the particle diameters.

The particle diameter of the crystals of aluminum oxide preferably have a kurtosis of 0 or more, and the kurtosis may be 1 or more and 8 or less, from the viewpoint of suppressing a local decrease in mechanical strength. When the kurtosis of the particle diameter of the crystals of aluminum oxide is 0 or more, variation in the particle diameter is suppressed. As a result, aggregation of pores is reduced, and shedding generated from the contours or interiors of the pores can be reduced, particularly if the kurtosis is 1 or more. On the other hand, when the kurtosis of the particle diameter of the crystals of aluminum oxide is 8 or less, crystals having a large particle diameter and crystals having a small particle diameter are present in an appropriate ratio. As a result, the structure is such that crystals having a small particle diameter fill the triple junctions and, consequently, the coefficient of thermal conductivity is improved.

Here, the kurtosis is an index (statistical) indicating to what extent a peak and a tail of a distribution differ from those of a normal distribution. When the kurtosis is more than 0, a distribution with a sharp peak is obtained. When the kurtosis is equal to 0, a normal distribution is obtained. When the kurtosis is less than 0, a distribution with a rounded peak is obtained. The kurtosis of the particle diameter of the crystals of aluminum oxide may be obtained using the function KURT available in Excel (trade name, available from Microsoft Corporation).

The insulating ring 13 is fixed to the conductor 11 via the first fixing member 15. The first fixing member 15 is formed of one of the above-described alloys, in other words, an Fe—Co based alloy, an Fe—Co—C based alloy, an Fe—Ni based alloy, or an Fe—Ni—Co based alloy. In a case where the first fixing member 15 is formed of one of such specific alloys, the alloy has an average coefficient of linear expansion from 30° C. to 400° C. that is lower than the average coefficient of linear expansion of copper, copper alloys, or the like constituting the conductor 11. In a case where the insulating ring 13 is formed of a ceramic, the average coefficient of linear expansion of the alloy is close to the average coefficient of linear expansion of the ceramic in the above-described temperature range. Thus, even when the conductor 11 and the insulating ring 13 are heat-bonded to each other with the brazing material, no gap is generated between the conductor 11 and the first fixing member 15 and between the insulating ring 13 and the first fixing member 15. As a result, the reliability of the airtightness can be increased. The Fe—Ni—Co based alloy may be used from the viewpoint that the Fe—Ni—Co based alloy has the lowest average coefficient of linear expansion from 30° C. to 400° C. among these alloys and in a case where heat bonding is performed close to the average coefficient of linear expansion of the ceramic in the above temperature range, the risk of occurrence of cracks in the ceramic is the lowest.

The size of the insulating ring 13 is not limited as long as the conductor 11 can be inserted therein. For example, the outer diameter of the insulating ring 13 is approximately from 1.2 to 1.5 times larger than the outer diameter of the conductor 11. The thickness of the insulating ring 13 is also not limited and is, for example, approximately from 28 mm to 32 mm. The thickness of the insulating ring 13 is preferably 5 times or more the thickness of the metal ring 12, from the viewpoint that stress remaining in the surface layer portion of the insulating ring 13 on the second fixing member 16 side is reduced and, consequently, cracks are less likely to occur. The thickness of the insulating ring 13 is preferably 15 times or less the thickness of the metal ring 12, from the viewpoint that the material cost can be reduced.

The insulating ring 13 is fixed to the conductor 11 at a distance from the metal ring 12. By providing the metal ring 12 and the insulating ring 13 at a distance from each other, stress remaining in the surface layer portion of the insulating ring 13 on the second fixing member 16 side is reduced. As a result, even when heating and cooling are repeated, cracks are less likely to occur in the insulating ring 13, the first fixing member 15, and the second fixing member 16. The distance between the metal ring 12 and the insulating ring 13 is not limited, and is appropriately set according to the size of the hermetic terminal 1. The distance between the metal ring 12 and the insulating ring 13 is, for example, approximately from 8 mm to 12 mm.

The flange 14 included in the hermetic terminal 1 according to an embodiment is installed on the insulating ring 13 and divides the conductor 11 into two regions. In the hermetic terminal 1 according to an embodiment, as illustrated in FIG. 1, the flange 14 divides the conductor 11 into a cylindrical portion and a quadrangular pillar shape (plate shape) portion.

The flange 14 is fixed to the insulating ring 13 via the second fixing member 16. The second fixing member 16 is formed of one of the above-described alloys, in other words, the Fe—Co based alloy, the Fe—Co—C based alloy, the Fe—Ni based alloy, or the Fe—Ni—Co based alloy. In a case where the second fixing member 16 is formed of one of such specific alloys, the alloy has an average coefficient of linear expansion from 30° C. to 400° C. that is lower than the average coefficient of linear expansion of copper, copper alloys, or the like constituting the conductor 11. In a case where the insulating ring 13 is formed of a ceramic, the average coefficient of linear expansion of the alloys is close to the average coefficient of linear expansion of the ceramic in the above-described temperature range. Thus, even when the conductor 11 and the insulating ring 13 are heat-bonded to each other with a brazing material, no gap is generated between the conductor 11 and the second fixing member 16 and between the insulating ring 13 and the second fixing member 16. As a result, the reliability of the airtightness can be increased. The Fe—Ni—Co based alloy is preferably used from the viewpoint that the Fe—Ni—Co based alloy has the lowest average coefficient of linear expansion from 30° C. to 400° C. among these alloys and in a case where heat bonding is performed close to the average coefficient of linear expansion of the ceramic in the above temperature range, the risk of occurrence of cracks in the ceramic is the lowest.

The size of the flange 14 is not limited as long as the conductor 11 can be inserted therein. For example, the outer diameter of the flange 14 is from 1.5 to 2.5 times the outer diameter of the insulating ring 13. The thickness of the flange 14 is not limited and is, for example, approximately from 8 mm to 16 mm. A plurality of holes are formed in the flange 14. These holes are screw holes used to fix the hermetic terminal 1 to a device.

The spacer 17 included in the hermetic terminal 1 according to an embodiment is provided between the metal ring 12 and the first fixing member 15. By providing the spacer 17, the holding force of the insulating ring 13 at the outer peripheral part increases and, consequently, the reliability of the resulting hermetic terminal 1 is further improved. The spacer 17 is formed of, for example, a stainless steel, such as SUS304, SUS304L, SUS304ULC, SUS310ULC, or SUSXM15J1. The thickness of the spacer 17 is not limited and is, for example, approximately from 6 mm to 14 mm.

A plurality of the spacers 17 are provided along a peripheral direction (circumferential direction in a case of the cylindrical conductor 11). The plurality of spacers 17 are preferably provided at regular intervals from the viewpoint that the outer peripheral part of the insulating ring 13 can be held relatively uniformly. As a result, the reliability of the resulting hermetic terminal 1 is further improved. Furthermore, in at least one of the plurality of spacers 17, a first groove portion may be formed on an outer peripheral surface of the spacer 17. By forming the first groove portion, even when heating and cooling are repeated, stress applied to the insulating ring 13 can be further reduced since the thermal stress is alleviated by the first groove portion. The first groove portion is formed, for example, along the above-described peripheral direction, and the shape thereof is a V-groove shape, a U-groove shape, or the like.

Figure 4A:
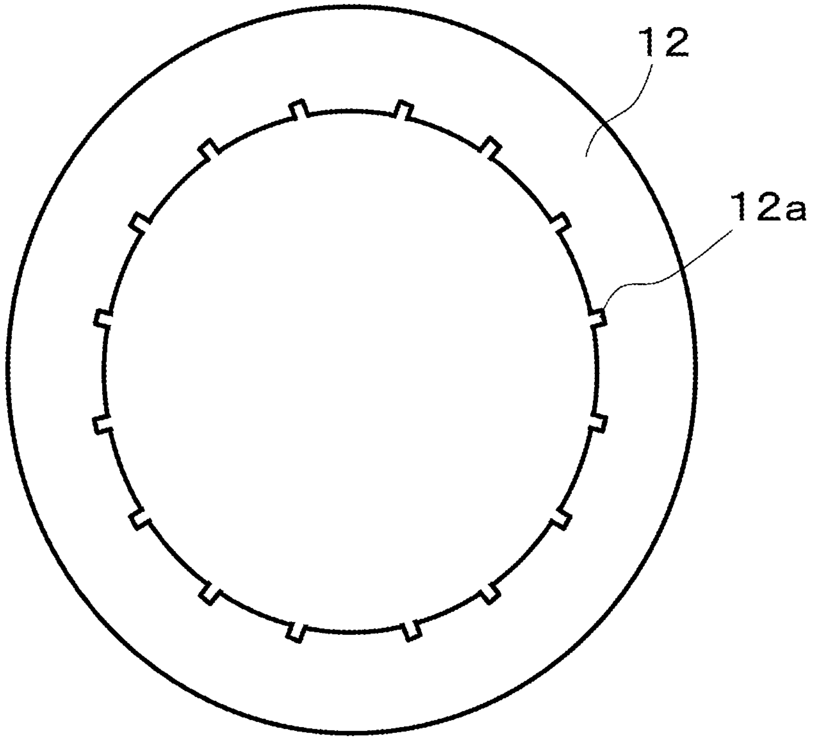
FIG. 4A is an explanatory diagram illustrating a metal ring included in the hermetic terminal according to an embodiment of the present disclosure.
Figure 4B:
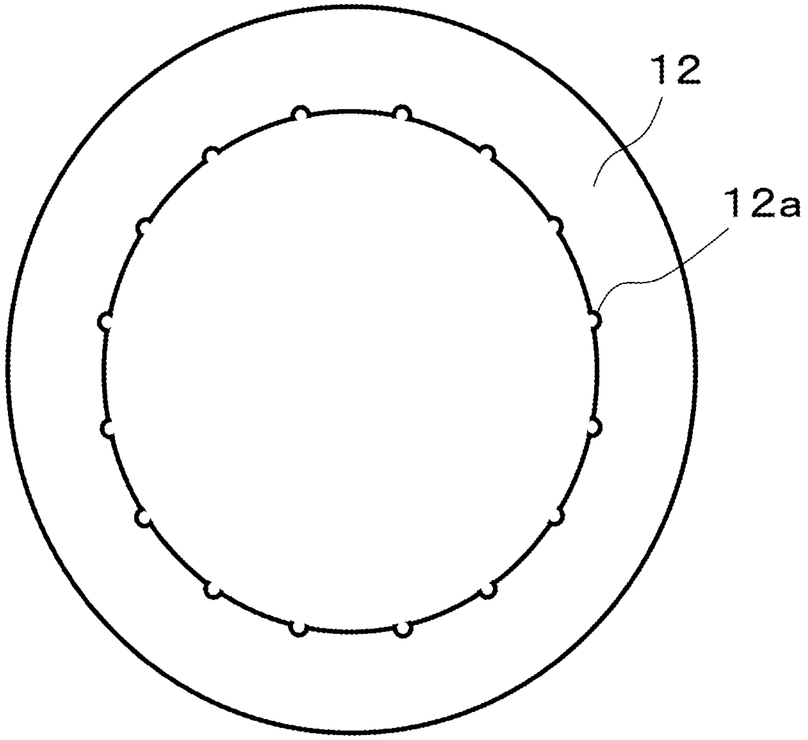
FIG. 4B is an explanatory diagram illustrating a variation of a metal ring included in the hermetic terminal according to an embodiment of the present disclosure.

Similarly, as illustrated in FIG. 4A or FIG. 4B, a plurality of second groove portions 12*a* may be formed in the inner peripheral surface of the metal ring 12. By forming the plurality of second groove portions 12*a*, even when heating and cooling are repeated, stress applied to the metal ring 12 can be further reduced since the thermal stress is alleviated by the second groove portions 12*a*. In particular, the plurality of second groove portions 12*a* are preferably positioned at regular intervals along the inner peripheral surface, and the number of the plurality of second groove portion is, for example, 3 or more and 20 or less. The shape of the plurality of second groove portions 12*a* is, for example, a rectangular shape as illustrated in FIG. 4A, or a semicircular shape as illustrated in FIG. 4B.

The hermetic terminal according to the present disclosure is not limited to the above-described embodiment. For example, the above-described hermetic terminal 1 is provided with the spacer 17. However, the hermetic terminal according to the present disclosure need not include the spacer 17. The spacer 17 is a member used to further improve the effect of the hermetic terminal according to the present disclosure.

In the hermetic terminal according to the present disclosure, at least one of the first fixing member 15 and the second fixing member 16 may include a sleeve having a bent portion. According to such a configuration, stress in the vicinity of the bent portion of the first fixing member 15 and the second fixing member 16 is further reduced, so that cracks are further less likely to occur. The inner diameter (radius) of the bent portion is not limited and may be 2 mm or more, and may be 4 mm or less, in consideration of a further superior effect of reducing stress.

Figure 3:
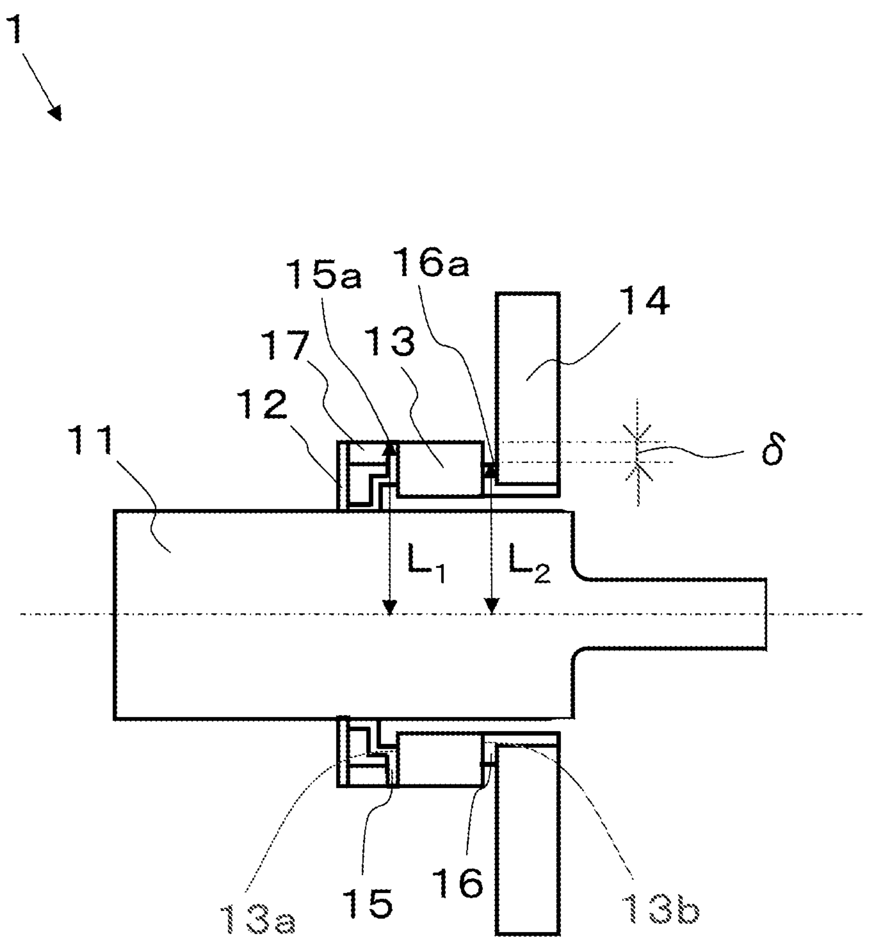
FIG. 3 is an explanatory diagram illustrating a variation of a second fixing member included in the hermetic terminal according to an embodiment of the present disclosure.

In the hermetic terminal according to the present disclosure, distances $L_1$ and $L_2$ from the axial center of the conductor 11 to front tip surfaces 15*a* and 16*a* of the first fixing member 15 and the second fixing member 16, respectively may be equal to each other as illustrated in FIG. 2, or may be different from each other as illustrated in FIG. 3. The distances $L_1$ and $L_2$ from the axial center of the conductor 11 to the front tip surfaces 15*a* and 16*a* of the first fixing member 15 and the second fixing member 16, respectively are preferably different from each other as illustrated in FIG. 3 from the viewpoint that cracks along the axial direction are less likely to occur in the insulating ring 13. The reason for this is that for example, even when the insulating ring 13 is pulled in the axial direction by shrinkage of the brazing material during a temperature drop in the bonding process of the brazing material, tensile stress of the pulling can be suppressed. A difference $\delta$ between the distances $L_1$ and $L_2$ from the axial center of the conductor 11 to the front tip surfaces 15*a* and 16*a* of the first fixing member 15 and the second fixing member 16, is, for example, 3 mm or more and 6 mm or less.

In the above-described hermetic terminal 1, the conductor 11 has a shape such that the cylindrical portion and the quadrangular pillar shape (plate shape) portion are present. However, the shape of the conductor in the hermetic terminal according to the present disclosure is not limited as long as it is a pillar shape. The shape of the conductor may be appropriately designed according to a device or the like to be provided with the hermetic terminal.

REFERENCE SIGNS LIST

1 Hermetic terminal
11 Conductor
12 Metal ring
13 Insulating ring
14 Flange
15 First fixing member
16 Second fixing member
17 Spacer

The invention claimed is:

1. A hermetic terminal comprising:
a conductor having a pillar shape;
a metal ring coaxially positioned with the conductor;
an insulating ring coaxially positioned with the conductor;
a flange disposed on the insulating ring and configured to divide the conductor into two regions;
a first fixing member configured to fix the insulating ring to the conductor; and
a second fixing member configured to fix the insulating ring to the flange, wherein
the metal ring, the first fixing member, and the second fixing member are formed of an Fe—Co based alloy, an Fe—Co—C based alloy, an Fe—Ni based alloy, or an Fe—Ni—Co based alloy,
the metal ring and the first fixing member are connected to each other, and
the insulating ring is fixed to the conductor at a distance from the metal ring.

2. The hermetic terminal according to claim 1, wherein
a thickness of the insulating ring is 5 to 15 times more than a thickness of the metal ring.

3. The hermetic terminal according to claim 1, wherein
at least one of the first fixing member and the second fixing member includes a sleeve having a bent portion, and
an inner radius of one bent portion is 2 mm or more.

4. The hermetic terminal according to claim 1, wherein
distances from an axial center of the conductor to front tip surfaces of each of the first fixing member and the second fixing member are different from each other.

5. The hermetic terminal according to claim 1, wherein
the metal ring has an inner peripheral surface on which a plurality of second groove portions are formed.

6. The hermetic terminal according to claim 1, wherein
a plurality of spacers are provided along a peripheral direction between the metal ring and the first fixing member.

7. The hermetic terminal according to claim 6, wherein
the plurality of spacers are disposed at regular intervals.

8. The hermetic terminal according to claim 6, wherein
at least one of the plurality of spacers has an outer peripheral surface on which a first groove is formed.

9. The hermetic terminal according to claim 1, wherein
the insulating ring contains a ceramic containing aluminum oxide as a main component, and
crystals of the aluminum oxide have an average particle diameter from 5 μm to 20 μm.

10. The hermetic terminal according to claim 9, wherein
particle diameters of the crystals of the aluminum oxide have a kurtosis of 0 or more.

* * * * *